Patented Nov. 19, 1946

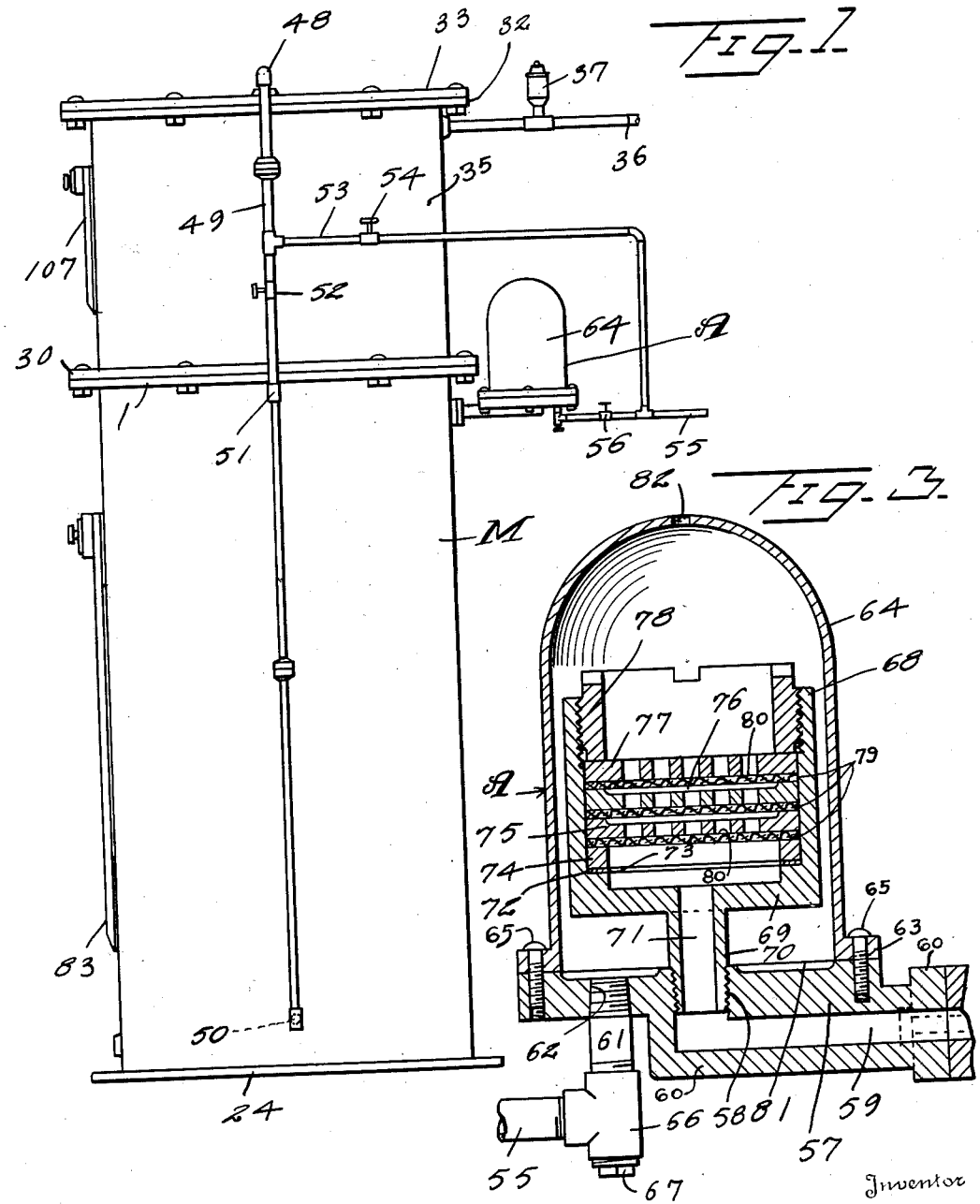

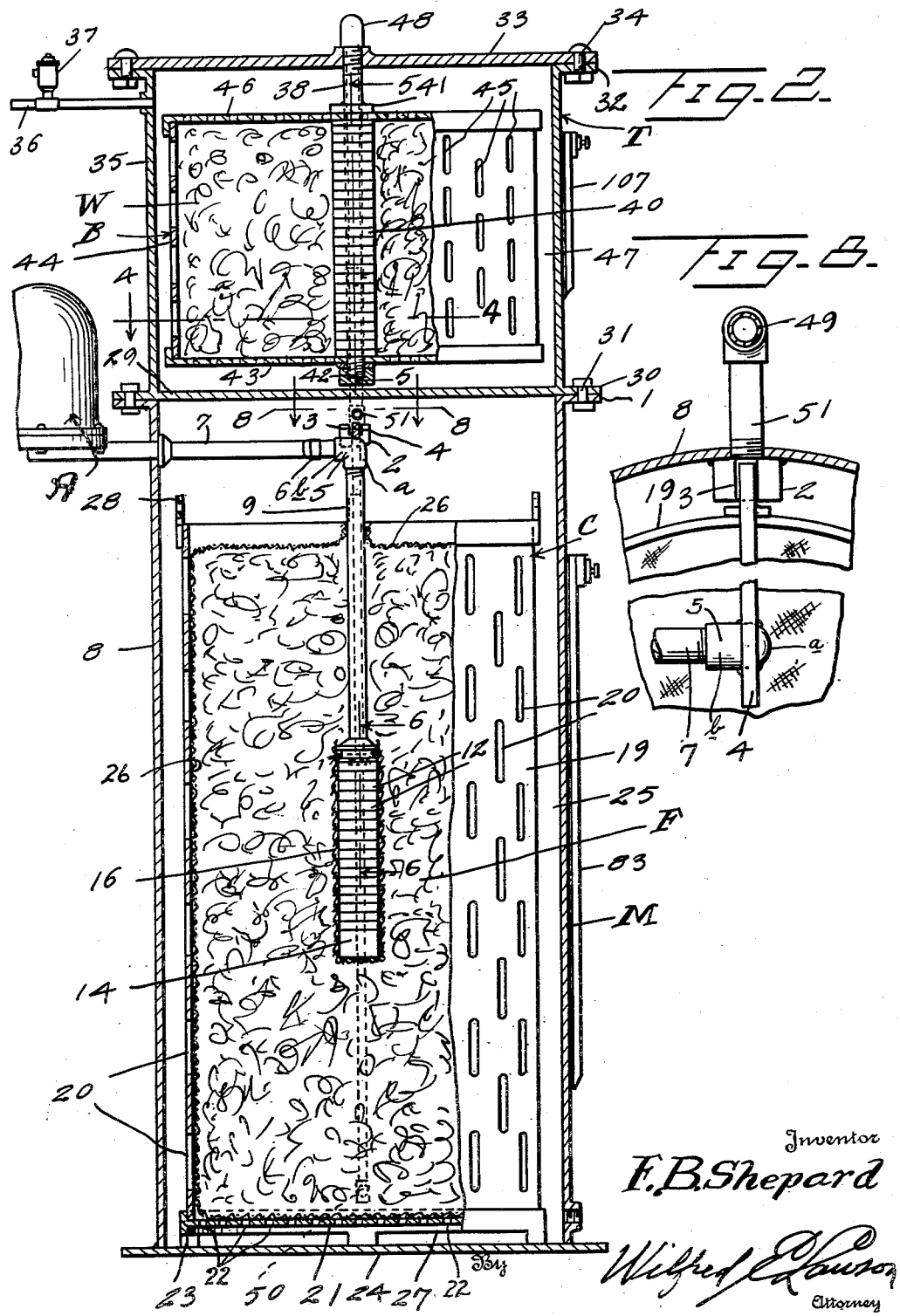

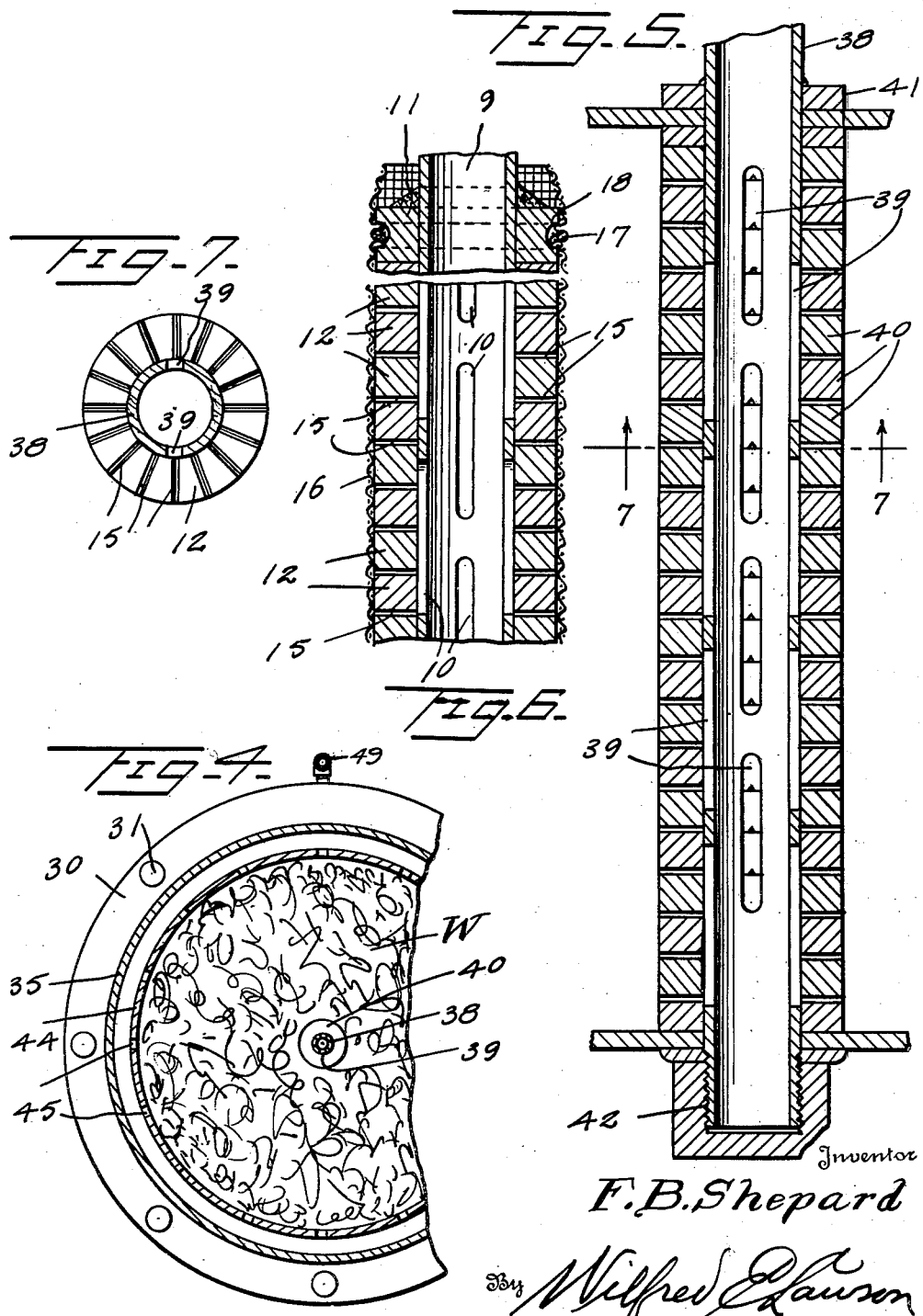

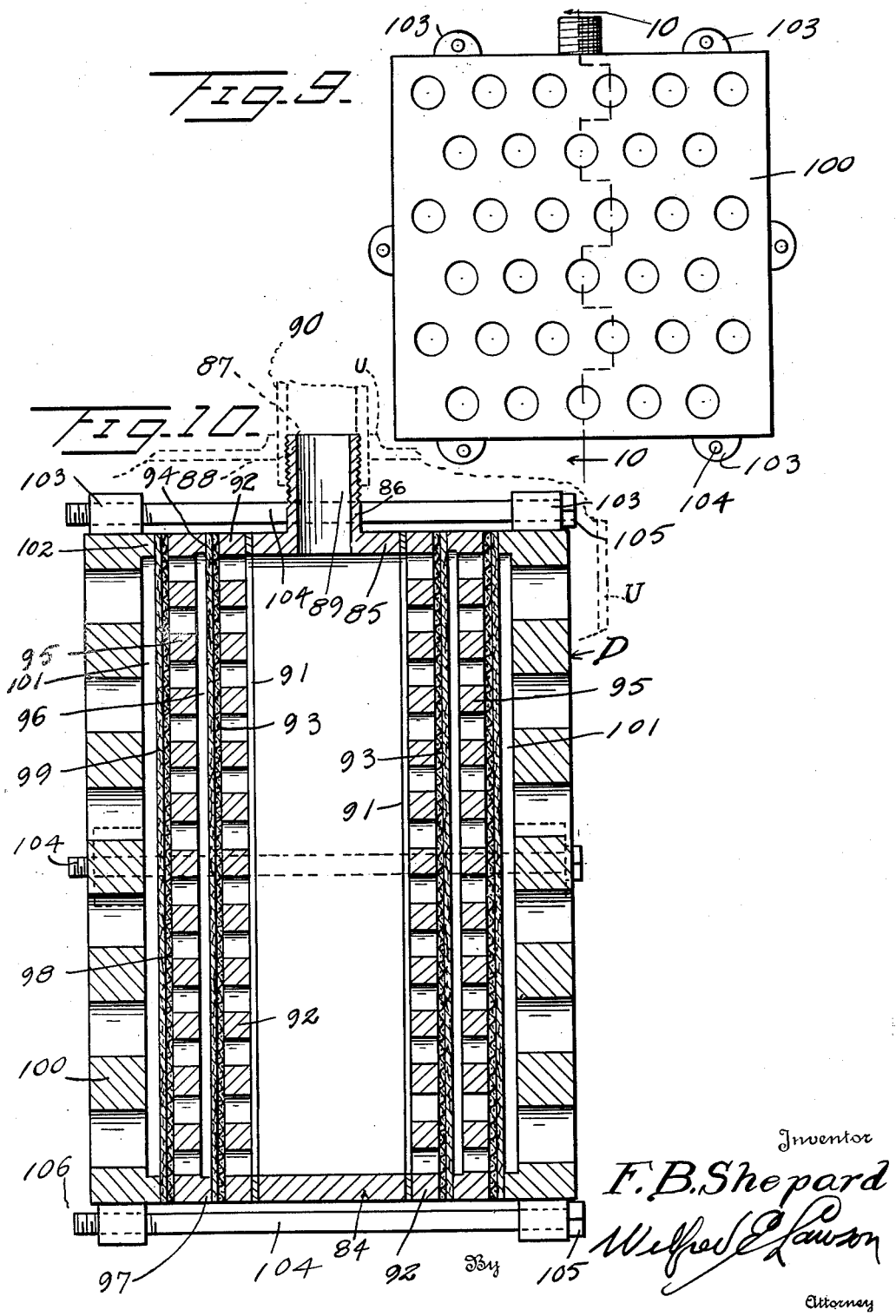

2,411,341

UNITED STATES PATENT OFFICE 2,411,341

FILTERING APPARATUS

Frank B. Shepard, Texon, Tex.

Application April 12, 1943, Serial No. 482,748

3 Claims. (Cl. 210—150)

This invention relates to a filtering apparatus, and it is primarily the purpose of the invention to provide an apparatus of this kind for purifying lubricating oils used in the different types of internal combustion engines although it can be employed with equal advantage in the reclaiming of lubricating and cutting oils used for all purposes.

The invention also has for an object to provide an apparatus of this kind including filtering media of different kinds as, for example, a waste pack and fuller's-earth units to assure the reclaimed oil being substantially clear of all heavy matter, such as iron oxide, carbon, dust, practically all abrasive matter, water, etc., and restored to practically its original state of utility.

It is also an object of the invention to provide a filtering apparatus employing filtering units of different characters and wherein each of said units can be readily and conveniently replaced.

A still further object of the invention is to provide an apparatus of this kind including the use of two different characters of filtering units, one of which is a fuller's-earth unit and the other of a character to materially relieve the fuller's-earth unit of its burden and thereby materially prolong the useful life of the fuller's-earth unit.

The invention also comprises as an object to provide an apparatus of this kind including a screen element comprised in the fuller's-earth filtering unit constructed and assembled in a manner whereby the resistance to flow is equalized practically throughout the entire surface, whereby the unit will possess capacity sufficient to handle a reasonably large flow of fluid and will so equalize the pressure to prevent channeling of the fluid in the fuller's-earth.

The invention consists in the details of construction and in the combination and arrangement of the several parts of my improved filtering apparatus whereby certain advantages are attained, as will be hereinafter more fully set forth.

In order that my invention may be better understood, I will now proceed to describe the same with reference to the accompanying drawings, wherein:

Figure 1 is a view in elevation and of a somewhat diagrammatic character illustrating a filtering apparatus constructed in accordance with an embodiment of the invention.

Figure 2 is an enlarged vertical sectional view taken through the device as illustrated in Figure 1, with parts in elevation.

Figure 3 is an enlarged vertical sectional view, with parts in elevation, taken through the filtering case as herein comprised.

Figure 4 is a fragmentary sectional view taken substantially on the line 4—4 of Figure 2.

Figure 5 is a sectional view taken substantially on the line 5—5 of Figure 2.

Figure 6 is a detailed sectional view taken substantially on the line 6—6 of Figure 2.

Figure 7 is a detailed sectional view taken substantially on the line 7—7 of Figure 5.

Figure 8 is a fragmentary sectional view taken substantially on the line 8—8 of Figure 2.

Figure 9 is a view in side elevation of a filtering element constructed in accordance with another embodiment of the invention, and Figure 10 is an enlarged sectional view taken substantially on the line 10—10 of Figure 9.

As disclosed in the accompanying drawings, M denotes a main pressure tank of desired dimensions and having its upper or top end open, with said top end defined by an outstanding flange 1. At diametrically opposed points and closely adjacent to its top open end, the tank M has suitably secured to the inner faces thereof the opposed plates 2 welded or otherwise securely held in applied position. Each of these plates is provided in its upper portion with an upwardly facing notch or recess 3 in which is received from above an end portion of a supporting bar 4 which extends radially across the upper portion of the tank M.

At substantially the axial center of the tank M, the bar 4 has rigidly secured thereto from below an elbow 5, one leg $a$ of which extends downwardly and the second and upper leg $b$ of which extends laterally. The upper or lateral leg $b$ of the elbow 5 has coupled thereto, as at 6, an end portion of a pipe 7 which extends outwardly of the tank M through a side wall 8 thereof for a purpose to be hereinafter more particularly referred to.

The depending leg $a$ of the elbow 5 has coupled thereto the upper end portion of a pipe 9 of material length and which has the lower portion of its wall at spaced points therearound and lengthwise thereof provided with the elongated and longitudinally disposed perforations or slots 10.

Surrounding this pipe 9 at a point above but closely adjacent to the lower slotted portion thereof and rigidly secured thereto is an outstanding member or washer 11 against which abuts or contacts from below the uppermost of the annular screening elements or parts 12 snugly surrounding the lower or perforated portion of the pipe 9.

These elements or members 12 are of a number to extend from the member or washer 11 to a point closely adjacent to the lower end of the pipe 9 and adjacent elements or members 12 are held in close contact one with the other by a blind nut 14 threading upon the lower portion of the pipe 9 below the applied elements or members 12 and having contact from below with the lowermost of such elements or members 12.

The under surface of each of these elements or members 12 is provided thereacross at points spaced equidistantly therearound with the radially disposed and shallow grooves or channels 15 through which the fluid, such as oil to be reclaimed, may readily seep or flow into the lower portion of the pipe 9 through the openings 10 thereof.

Substantially tightly disposed over the applied elements or members 12 and blind nut 14 is a fabric sack or sock 16. This sack or sock 16 is applied from below and has its upper end portion surrounding the member or washer 11 and held thereto by a tie wire 17 or other flexible strand. To facilitate this securement of the sack or sock 16, the periphery of the member or washer 11 is provided circumferentially therearound with the groove or channel 18 into which the adjacent portion of the sack or sock is compressed under the action of the tie wire 17.

The pipe 9 extends downwardly at substantially the axial center of a cylindrical cage or basket C, the wall 19 of which, at points circumferentially therearound and at points spaced lengthwise thereof, is provided with the elongated slots or perforations 20. This pipe 9 is of a length to position the lower portion thereof surrounded by the elements or members 12 at substantially the center of the cage or basket C.

The bottom 21 of the cage is also provided with the perforations 22 and depending from the peripheral portion of this bottom 21 are the equidistantly and circumferentially spaced legs 23 which rest directly upon the bottom 24 of the main tank M whereby the bottom 21 of the cage or basket C is spaced as desired above the bottom 24 of the tank M.

The cage or basket C is of a diameter less than the interior diameter of the tank M so that when the cage or basket C is in applied position within the tank M, said cage or basket C is surrounded by a space 25. The top or upper end of the cage or basket C is open, so that the desired filler F of fuller's-earth may be readily placed within or removed from the cage or basket C. As illustrated in the accompanying drawings, this filler F is contained within a fabric sack 26 of desired capacity, so that the filler F, in fact, constitutes a unit or cartridge which can be quickly applied or removed. After application of the cartridge, the upper open or mouth end of the sack 26 is closed in a manner to snugly surround the adjacent upper portion of the pipe 9.

The upper open end of the cage or basket C, at points spaced circumferentially therearound, is provided with the upstanding straps, each of which is provided in its upper portion with an opening 28. These straps 28 provide means whereby the cage or basket C may be readily handled for placement within the main basket M or removed therefrom. The openings 28 make it possible for lifting hooks to be effectively engaged with the straps.

It is to be pointed out that the screening elements or members 12 provide a comparatively large area in order to assure sufficient screening capacity with the resistance to flow practically equalized throughout the entire surface. By the provision of the grooves or channels 15, which provide minute openings, sufficient capacity is afforded to handle a large flow of fluid spread out over a comparatively large area in order to equalize the pressure. This assembly embodying the screening elements or members 12 assures equal pressure through the filler F to prevent channeling of the fluid in such filler and at the same time assures the screening out of all minute abrasive particles of the filler F. The applied sack or sock 16 also serves as a further screening medium.

Overlying the upper open top of the main tank MM is a second pressure tank T. The lower end of this tank T is closed by a bottom 29 and the lower end of this tank T is defined by the outstanding surrounding flange 30 which rests upon the flange 1 of the main tank M. These flanges 30 and 1 are bolted, as at 31, or otherwise detachably connected, so that the upper pressure tank T may be readily applied or removed as desired.

The top of the tank T is also open and said top or open end is defined by an outstanding surrounding flange 32 upon which rests the peripheral portion of the cover plate 33 for this tank T and which plate 33, as herein disclosed, is bolted, as at 34, or otherwise detachably connected to the flange 32. The upper portion of the tank T and at a point closely adjacent to the top thereof has in communication therewith, through the side wall 35 of the tank T, an inlet pipe 36 leading from the source of supply of oil or other fluid to be reclaimed or purified.

Interposed in this pipe 36 is a spring-loaded adjustable by-pass valve 37 of any preferred type for the purpose of maintaining desired pressure and also to serve as a safety. Depending from the cover plate 33 at the axial center thereof is a pipe 38 of a length to terminate above but in relatively close proximity to the bottom 29 of the tank T. The lower major portion of this pipe 38 is provided at points therearound and lengthwise thereof with the elongated perforations or slots 39 and surrounding such perforated portion of the pipe 38 are the screening elements or members 40, with adjacent elements or members in close contact one with the other and with the uppermost element or member 40 having direct contact with a surrounding member or shoulder 41 fixedly carried by the upper portion of the pipe 38.

The lower end portion of the pipe 38 has threaded thereon a blind nut 42 which operates to hold the elements or members 40 in desired assembly upon the pipe 38 and also for clamping the lower portion of the pipe 38 to the bottom or lower perforated lid or cover 43 for the cylindrical waste cage or basket B. The side wall 44 of this container is also provided at spaced points therearound and at points spaced between the top and bottom thereof with the elongated perforations or slots 45 while the upper end of the cage or basket B is closed by the perforated top lid or cover 46.

This cage or basket B is tightly packed with a waste filler W and the cage or basket B is of a diameter less than the interior diameter of the tank T so that a space 47 surrounds the applied cage or basket B. It is also to be noted that this cage or basket B, when applied, has its bottom cover 43 spaced from the bottom 29 of the tank T and has its top cover or lid 46 spaced from the cover plate 33 of the tank T.

Leading from and in communication with the upper portion of the pipe 38 is a discharge pipe 48. This pipe 48 is above the cover plate 33 and extends radially thereof to a desired point therebeyond. The outer end portion of this pipe 48 is continued by a depending pipe line 49 which is continued by a point closely adjacent to the lower end of the tank M. This lower end portion of the pipe line 49 is in communication, as at 50, with the lower portion of the tank M through the side wall 8 thereof and also in communication, as at 51, with the upper portion of the tank M through its side wall 8.

The pipe line 49 at a point above the connection 51 has interposed therein a regulating or control valve 52 of desired type and in communication with the pipe line 49 above or in advance of the valve 52 is a pipe line 53 having interposed therein a regulating or control valve 54 of any type preferred. This pipe line 53 leads to and is in communication with an outlet pipe 55 leading from a filtering case A. This pipe line 55 in advance of its connection with the pipe line 53, or at a point between such connection and the case A, has interposed therein a control or regulating valve 56. By closing the valves 52 and 56, with, of course, the valve 54 open, the oil or other fluid may be by-passed direct from the upper tank T to the outlet pipe 55.

The filtering case A, as herein disclosed, comprises a base casting or member 57 provided at its center with an axial opening 58 continued by an outwardly and radially disposed inlet port 59 with which communicates the extremity of the pipe 7, hereinbefore referred to. This port 59 is extended through an outwardly directed boss 60 carried by the casting or base member 57 and to which the outer extremity of the pipe 7 is suitably coupled.

The outlet pipe 55, hereinbefore referred to, is in communication with the filtering case A through this base casting or member 57 through the medium, in the present embodiment of the invention, of an upstanding nipple 61 suitably coupled to the outlet pipe 55 and threading from below up within a suitably positioned opening 62 disposed through the base casting or member 57.

Resting from above on the marginal portion of the base casting or member 57 is in outwardly disposed flange 63 defining the lower open marginal portion of a dome 64. This dome is effectively held in applied position by the cap screws 65 disposed at desired points through the flange 63 and threading from above into the peripheral portion of the base casting or member 57.

The T coupling 66 which connects the pipe 55 and the nipple 61 has it lower end closed by a removable plug 67 whereby, when desired, the nipple 61 can be employed as a drain or clean-out for the chamber within the applied dome 64.

Positioned within the dome 64 substantially centrally thereof is a cup-like filter body 68 and depending from the central portion of the bottom 69 of the filter body 68 is a tubular stem 70 threading from above or otherwise effectively engaged within the opening 58, whereby the body member 68 is mounted and maintained in desired position within the dome 64. The bore 71 of the stem 70 is open at its lower end, whereby direct communication is had with the inlet port 59 while the opposite or upper end of the bore 71 opens through the bottom 69 of the filter body 68 for communication within said body 68.

The filter body 68 at a point above and in relatively close proximity to the bottom 69 thereof is provided with the internal and upwardly facing continuous shoulder 72 upon which is placed a ring gasket 73 of desired material. Superimposed upon this gasket 73 is a spacing ring 74 with which engages from above the peripheral portion of a lower flat perforated disk 75. In the present embodiment of the invention, these disks 75 are shown as two in number although, of course, such number may be varied as the requirements of practice may prefer.

Each of these disks 75 has its entire under area flat and coplanar while the upper surface of each of the disks 75 is recessed, as at 76, over a major portion thereof to provide a shallow chamber. Superimposed on the upper disk 75 is a perforated disk 77 having both its top and bottom surfaces flat and coplanar, and bearing from above on the peripheral portion of this disk 77 is a holding or jamb nut 78 threading from above down into the upper portion of the filter body 68.

Interposed between the lower disk 75 and the spacing ring 74, between adjacent disks 75 and between the top disk 75 and the disk 77, are the superimposed laminations 79 and 80, one constituting a filtering cloth or paper 80 and the other a fine mesh supporting screen 79. These laminations 79 and 80 are effectively clamped in desired position under the action of the jamb or holding nut 78.

It is to be noted that the base casting or member 57 is provided with a relatively wide annular recess 81 to bleed fluid below the overflowing point when draining. The dome 64 at its high point is provided with a tapped opening 82 to provide an air bleeder.

The main tank M has suitably supported against its outer surface at a desired location an elongated heating element 83 of a type preferred and the location of this element 83 is where it will give the best efficiency depending on the size and capacity of the tank M and the parts therein. While, in the accompanying drawings, only a single heating element 83 is shown, it is believed to be obvious that as many may be employed as practice may demand and it is also believed to be obvious that such heating element or elements are to be thermostatically controlled so that the same will be ineffective when the temperature of the fluid within the tank M is below a predetermined or desired degree.

It is believed to be apparent from the foregoing that the invention as herein described is one which provides what may be termed a two-one which provides what may be termed a two-stage filtering apparatus for the purpose of filtering lubricating oils and other liquids. The fluid enters the upper tank T through the pipe 36 and thence, under pressure, through the waste filler W, between the screening elements or members 40 and out through the pipe 48 and pipe 49, when the valve 52 is opened and the valve 54 closed, into the main tank T at 50 and 51. The fluid within the main tank M then passes under pressure through the filler F of fuller's-earth and between the screening elements or members 12 and out through the pipes 9 and 7 into the filtering case A. From the filtering case A the fluid passes out through the pipe 55, when the valve 56 is opened, to a desired point of discharge.

In Figures 9 and 10 is illustrated a filtering element that can be substituted for the waste pack filtering element located in the upper tank T in the first embodiment of the invention. This filtering element or unit D, as herein disclosed, comprises a central box-like frame or casting 84 herein disclosed as substantially square in form and which has its side faces open. In Figure 10 the top and bottom parts are seen in section and one vertical side is seen, through the frame, in elevation.

This frame or casting 84 is vertically disposed when in applied position within the upper pressure tank U, which corresponds to tank T, and the top member 85 of this frame or casting 84 at its center is provided with an upstanding tubular boss 86 which threads from below into a central opening 87 in the cover plate 88 for the tank U. The bore 89 of the boss or nipple 86 is open at both ends and leading from the opening 87 of the cover plate 88 is the carry-off pipe 90 corresponding to the pipe 48 of the first embodiment of the invention.

Contacting with the edge faces of the sides of the frame or casting 84 and conforming to said sides of the frame or casting are the continuous gaskets 91 and bearing against these gaskets 91 are the peripheral portions of the perforated plates 92 which overlie the open sides of the frame or casting 84. Disposed over the outer face of each of these plates 92 is a fine mesh wire screen 93 for supporting the overlying lamination 94 of a filtering paper or cloth.

Outwardly of each applied filtering lamination 94 is a perforated plate 95 of substantially the same dimensions and configuration as the adjacent plate 92. The outer face of this plate 95 is flat over its entire area while the inner face of the plate 95 has its major portion recessed, as at 96, providing a comparatively shallow space between the plate 95 and the lamination 94 for the purpose of equalizing the pressure distribution and for retaining the foreign matters filtered out of the fluid.

The peripheral portion 97 of the plate 95 coacts with the peripheral portion of the plate 92 to clamp therebetween the peripheral marginal portions of the screen 93 and the overlying lamination 94. The outer flat face of each of the plates 95 also has disposed thereover a fine wire screen 98 upon which is disposed thereover the filtering lamination 99 of paper or cloth and outwardly of the applied screen 98 and lamination 99 is an outer perforated plate 100.

The outer face of this plate 100 is flat while the inner face is provided with the comparatively shallow recess 101 extending over a substantial portion of said face. The peripheral portion 102 of this plate 100 coacts with the peripheral marginal portion of the plate 95 to clamp therebetween the peripheral or marginal portions of the applied screen 98 and cloth 99.

The outer plates 100 are provided at their edges with the outstanding perforated lugs 103, with the lugs 103 of one plate aligned with the lugs 103 of the second plate in the assembly, so that the elongated rigid members or bolts 104 may be passed through the aligned lugs 103 with the head 105 at one end of each of the bolts 104 contacting with the outer end of a lug 103 and a holding nut 106 threading upon the opposite end portion of the member or bolt 104 contacting with the outer end of the aligned lug 103. These bolts 104 with their associated nuts 106 serve to effectively maintain the various parts of the element or unit D in desired assembled relation.

The fluid entering the tank U flows inwardly through the perforated plates 100, 97 and 92 and the interposed laminations 99 and 94 and screens 98 and 93 into the frame or casting 84 and out through the bore 89 of the boss or nipple 86 and out through the discharge or delivery pipe 90.

This filtering element or unit D can be successfully used in connection with various fluids but it is primarily intended for filtering electrical transformer and electrical switch oils.

Again referring to the first embodiment of the invention, it is to be pointed out that the top or upper tank T has suitably supported against its outer surface at a desired location an elongated heating element 107 of a type preferred and the location of this element 107 is where it will give the best efficiency depending on the size and capacity of the tank T and the parts therein. While, in the accompanying drawings, only a single heating element 107 is shown, it is believed to be obvious that as many may be employed as practice may demand and it is also believed to be obvious that such element or elements are to be thermostatically controlled so that the same will be ineffective when the temperature of the fluid within the tank T is below a predetermined or desired degree. It is to be stated that a similar heating means is to be used in connection with the tank U as comprised in the second embodiment of the invention.

From the foregoing description it is thought to be obvious that a filtering apparatus constructed in accordance with my invention is particularly well adapted for use by reason of the convenience and facility with which it may be assembled and operated.

What is claimed is:

1. In a filtering apparatus, a filtering unit comprising a central frame having open sides, a discharge nipple carried by and opening into the frame, said nipple comprising means for suspending the unit in position, perforated plates clamped to the frame and covering the open sides thereof, and screening laminations clamped between the adjacent perforated plates and covering the open sides of the frame.

2. In a filtering apparatus, a filtering unit comprising a central frame having open sides, a discharge nipple carried by and opening into the frame, said nipple comprising means for suspending the unit in position, perforated plates clamped to the frame and covering the open sides thereof, and screening laminations clamped between the adjacent perforated plates and covering the open sides of the frame, the inner faces of the outer plates having their major surfaces recessed.

3. In a filtering apparatus, a receptacle having an inlet and bottom and side walls, a foraminous container having an open top and positioned within and resting freely on the bottom wall of the receptacle, an outlet pipe having an inlet end, means removably suspending the outlet pipe in the receptacle with said inlet end disposed within the foraminous container, said outlet pipe having an end extending to the exterior of the receptacle, a screening means covering the inlet end of the outlet pipe, a filtering substance filling said foraminous container and completely enclosing the inlet end of the outlet pipe and the straining means carried thereby, the said suspending means for the outlet pipe comprising a bar having the outlet pipe secured thereto and extending diametrically across the receptacle above the foraminous container, and means secured to the inner wall of the receptacle at each of two diametrically opposite positions for removably receiving the ends of said bar.

FRANK B. SHEPARD.